(12) United States Patent
Yamamoto

(10) Patent No.: US 7,344,669 B2
(45) Date of Patent: Mar. 18, 2008

(54) PLURAL COLOR COMPONENT FILM LAMINATE PART AND METHOD OF MAKING SAME

(75) Inventor: Hiroaki Yamamoto, Brookville, OH (US)

(73) Assignee: Green Tokai Co., Ltd., Brookville, OH (US)

( * ) Notice: Subject to any disclaimer, the term of this patent is extended or adjusted under 35 U.S.C. 154(b) by 621 days.

(21) Appl. No.: 10/489,706

(22) PCT Filed: Aug. 21, 2002

(86) PCT No.: PCT/US02/26546

§ 371 (c)(1),
(2), (4) Date: Mar. 15, 2004

(87) PCT Pub. No.: WO03/026864

PCT Pub. Date: Apr. 3, 2003

(65) Prior Publication Data

US 2004/0185228 A1  Sep. 23, 2004

Related U.S. Application Data

(60) Provisional application No. 60/323,874, filed on Sep. 21, 2001.

(51) Int. Cl.
  B29C 45/14 (2006.01)
  B29C 70/78 (2006.01)
  B29D 22/00 (2006.01)
  B29D 23/00 (2006.01)
  B32B 7/00 (2006.01)

(52) U.S. Cl. .................. 264/247; 264/269; 264/275; 428/35.7; 428/120; 428/192

(58) Field of Classification Search .............. None
  See application file for complete search history.

(56) References Cited

U.S. PATENT DOCUMENTS

| 4,205,036 | A | * | 5/1980 | Trame ..................... 264/132 |
| 5,152,861 | A | * | 10/1992 | Hann ..................... 156/230 |
| 5,599,608 | A | | 2/1997 | Yamamoto et al. |
| 5,746,962 | A | | 5/1998 | Yamamoto |
| 5,783,287 | A | | 7/1998 | Yamamoto et al. |
| 6,168,742 | B1 | | 1/2001 | Yamamoto |
| 6,214,266 | B1 | | 4/2001 | Millif et al. |
| 6,436,329 | B1 | | 8/2002 | Hardgrove et al. |
| 6,878,322 | B2 | * | 4/2005 | Yang ..................... 264/132 |

FOREIGN PATENT DOCUMENTS

JP   60-31934   *   2/1985

* cited by examiner

*Primary Examiner*—Edmund H. Lee
(74) *Attorney, Agent, or Firm*—Wegman, Hessler & Vanderburg

(57) ABSTRACT

A plural color component film laminate part and method for insert-molding a plural color film laminate part comprises preforming a film laminate and subsequently insert-molding a plastic substrate against the preformed film laminate. An improvement in traditional insert molding techniques is provided by use of a specific mold cavity structure which facilitates positioning of the film laminate transition line(s) between colors within longitudinally extending groove(s) in the part show face. According to one embodiment, the film laminate is preformed with a re-entrant edge portion which is positioned within the mold cavity such that the edge of the plastic substrate will be substantially covered. The insert molding step involves positioning the preformed film laminate in a specially configured mold cavity, closing the mold and injecting molten resin into the mold' cavity against the film laminate.

19 Claims, 6 Drawing Sheets

PLURAL COLOR COMPONENT FILM LAMINATE PART AND METHOD OF MAKING SAME

CROSS-REFERENCE TO RELATED APPLICATIONS

Priority filing benefit of (1) International PCT application PCT/U.S. 02/26546 filed Aug. 21, 2002, and published under PCT 21(2) in the English language and (2) U.S. Provisional Application Ser. No. 60/323,874 filed Sep. 21, 2001, now abandoned.

BACKGROUND OF THE INVENTION

The present invention pertains to improved methods of insert molding a film laminate, or the like, over a plastic substrate, or a portion thereof, and to fused film laminated parts made thereby.

A variety of injection molded parts have been made and used for automobile body and trim parts. For example, bumpers, body panels, doors, filler panels, wheel covers, dashboards, armrests and other parts have been made via injection molding techniques. Additionally, with regard to automobile exteriors, bodyside trim moldings, beltline moldings, roof moldings and window are made via injection molding of polyvinylchloride (PVC) or other thermoplastic materials.

In order to provide a painted surface for these parts, film lamination techniques are commonly employed. In accordance with these processes, a paint film laminate is insert molded with the desired thermoplastic to fuse the film laminate over the injection molded part. The resulting injection molded part is ready for assembly without subsequent painting.

The paint film laminate used in these insert molding techniques may comprise a backing sheet to which paint layers are adhered to form a colored side of the laminate. Typically, the backing sheet comprises an extruded thermoplastic sheet. In such paint film laminates, a paint film laminate, comprising a cast dried continuous paint coating, is provided over the backing sheet. The paint film laminate may consist of a monocoat, a clear coat over a base coat or a clear coat and a base coat with interposed print or design. The paint film laminate, including base coat, clear coat and print or design, if desired, may, for example, range from about 0.5-4 mil. in thickness.

The laminated paint films are typically provided in a roll, unwound, then trimmed to a proper "preform" size and shape, ready for insertion into the injection mold. The preform is usually placed along the cavity side of the mold with the painted side thereof facing the mold cavity surface.

In some instances, the pre-sized paint film laminate may be placed along the core side of the mold unshaped. The mold is then clamped and the desired molten resin is injected into the mold cavity. Heat and pressure conditions in the mold partially melt the backing sheet and a melt bonding or fusion of the injected resin and film laminate occur. Injection molds used for these processes are commonly rear or edge gated so that the molten resin is directed along the backside of the film laminate, pressing the show face side of the film laminate against the surface of the mold cavity. Techniques utilized to insert mold plastic parts covered by such paint film laminates are disclosed, for example, in U.S. Pat. Nos. 5,599,608; 5,783,287; 5,746,962 and 6,168,742 of common assignment herewith. The subject matter of these disclosures is incorporated by reference herein.

It has become increasingly popular to insert or co-mold bumper, rocker panel, side trim, and chin spoiler parts for autos and trucks which incorporate a paint film laminate which includes two different colored sections of the paint film in neighboring relation to each other on the surface of the part.

Conventionally employed insert molding techniques for manufacturing such plural colored laminate parts often result in an unsightly appearance wherein the transition line or border between neighboring colors of the paint film presents an uneven or wavy appearance that stands in contrast to the desired straight line or clean edge appearance that is intended between neighboring colors. This undesirable appearance may be caused, for example, by shrinkage or distortion of the paint film during the co-molding process.

Accordingly, there is a need in the art for a process for manufacturing a plural color paint film laminate structure and resulting structure wherein the transition area or boundary between neighboring colors on the show surface of the part appears straight or linear, providing a sharp, clean transition from one color area to its neighboring color area.

SUMMARY OF THE INVENTION

These and other objects of the invention are met by the instant methods and fused film laminate plastic parts made thereby.

In accordance with the present invention, a plural color component film laminate part is insert molded over the desired plastic substrate utilizing a specifically configured mold cavity. The plural color scheme is obtained by incorporating a single paint film laminate with multiple, different color, stripes or, although less preferred, by utilizing multiple individual pieces of various dolor paint film laminate.

The method includes the steps of performing a film laminate, or laminates, and subsequently insert molding a plastic substrate against the non-show-face side of the preformed film laminate. The film laminate performing step involves shaping an unformed film laminate in a specially configured vacuum mold and subsequently trimming the shaped film laminate to obtain the preformed film laminate to be insert molded. The insert molding step involves positioning the preformed film laminate in a specially configured mold cavity, closing the mold and injecting molten thermoplastic or thermosetting resin into the mold cavity against the non-show face side of the film laminate.

In one embodiment, the film laminate is preformed with a re-entrant longitudinal edge portion, in accordance with the '962 patent to Yamamoto, such that the re-entrant longitudinal edge portion of the paint film laminate wraps around or completely covers the associated longitudinal edge of the plastic substrate.

Improvement in traditional insert molding techniques is provided by utilization of a specific mold cavity structure which facilitates disposition of the transition line between various colored portions of the paint film within a groove which extends longitudinally along the show face side of the resulting part. The mold cavity is equipped with a partitioning member, or members, which align with the transition line between various paint film laminate colors. Each partitioning member is configured with a predetermined depth to width ratio which results in the transition line between various film laminate colors being disposed such that the viewer will see only the individual colors of the laminate covered part at the point where they crest the entrance to the resulting groove and not the actual transition line located near the bottom portion of the groove. Thus, from an aesthetic point of view, the observer will see a sharp, straight line distinction or border between the colors.

The invention will be further described in conjunction with the appended drawings and following detailed description.

DETAILED DESCRIPTION OF THE INVENTION

Figure 1:
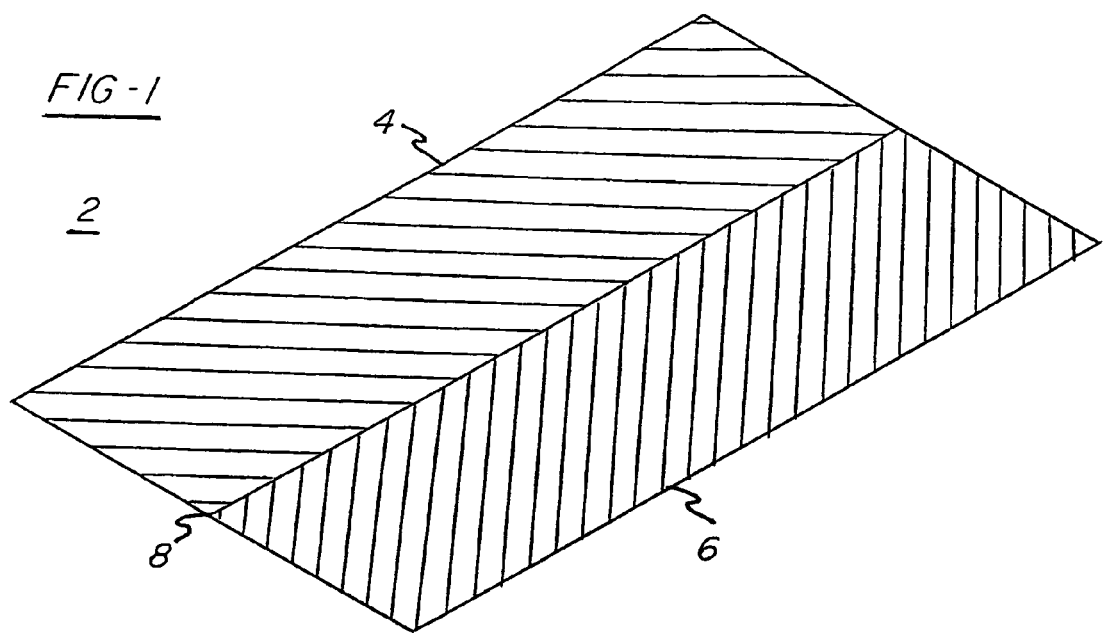
FIG. 1 is a perspective view of a two-tone paint film laminate sheet that may be used in accordance with the invention.

Turning first to FIG. 1 of the drawings, there is shown a paint film laminate 2 of the type that may be employed in accordance with the invention to provide a plural color component film laminate part. Here, the film laminate comprises a first colored section 4 and neighboring second colored section 6 with the colored sections separated by transition line 8 or border. Thus, the paint film laminate shown in FIG. 1 comprises a two-tone paint film laminate with the colors separated by the transition line 8.

In prior art auto or truck parts in which such laminates have been superposed or fused over an underlying thermoplastic or thermosetting resin, the transition line or border separating the colors tended to be wavy or distorted, thereby causing an unsightly appearance.

Figure 2:
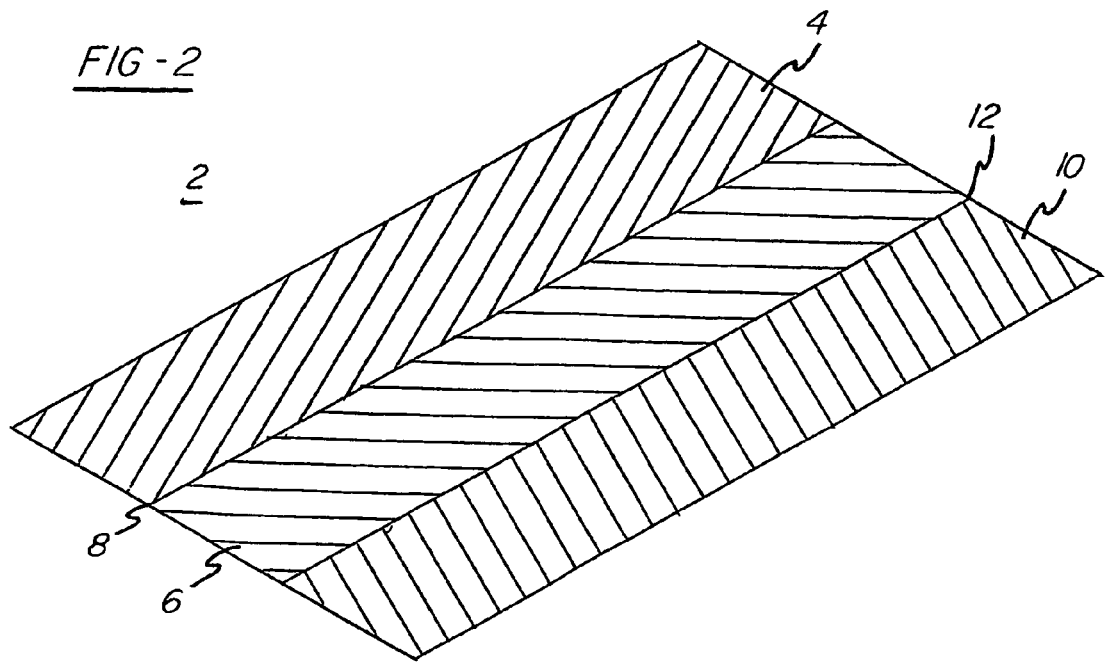
FIG. 2 is a perspective view of a three-color paint film laminate sheet that may be used in accordance with the invention.

FIG. 2 shows a three-tone paint film laminate having first colored section 4, second colored section 6, and third colored section 10. The second colored section is separated from the third colored section 10 by a transition line or border 12.

Figure 3:
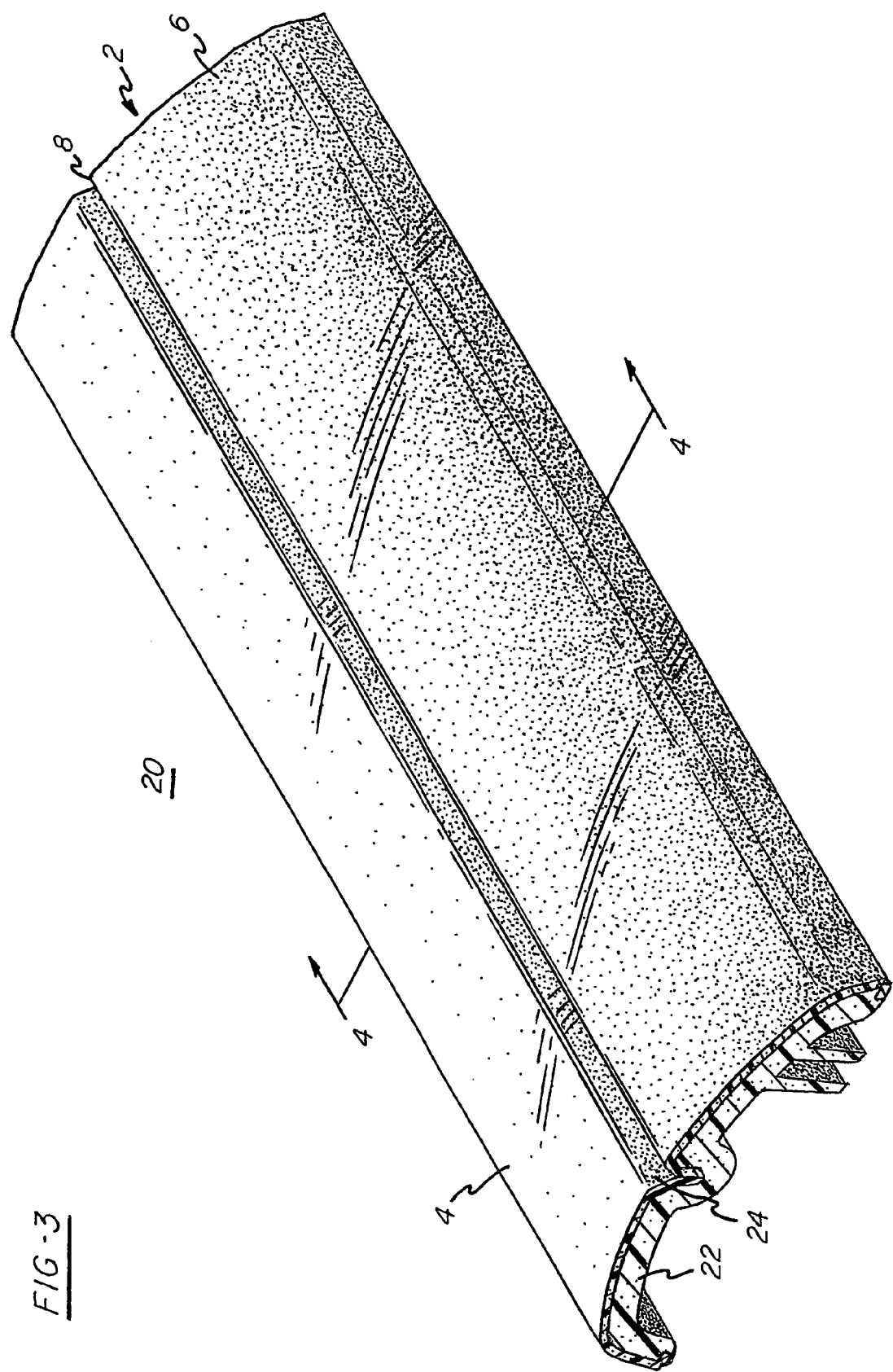
FIG. 3 is a cutaway perspective view of a two-color paint film covered part made in accordance with the invention.

Attention is now directed to FIG. 3 which is a partial cutaway perspective view of a plural color component film laminate part in accordance with the invention. Here, part 20 comprises paint film laminate 2 superposed over plastic substrate 22. The paint film laminate comprises a first colored section 4 and a second colored section 6 separated by transition line 8. Here, the transition line 8 is disposed entirely within the longitudinally extending groove 24 which is formed in the substrate 22. As such, the show side surface of the part provides an aesthetically pleasing appearance in that no wavy or distorted transition line is manifest to the viewer.

Figure 4:
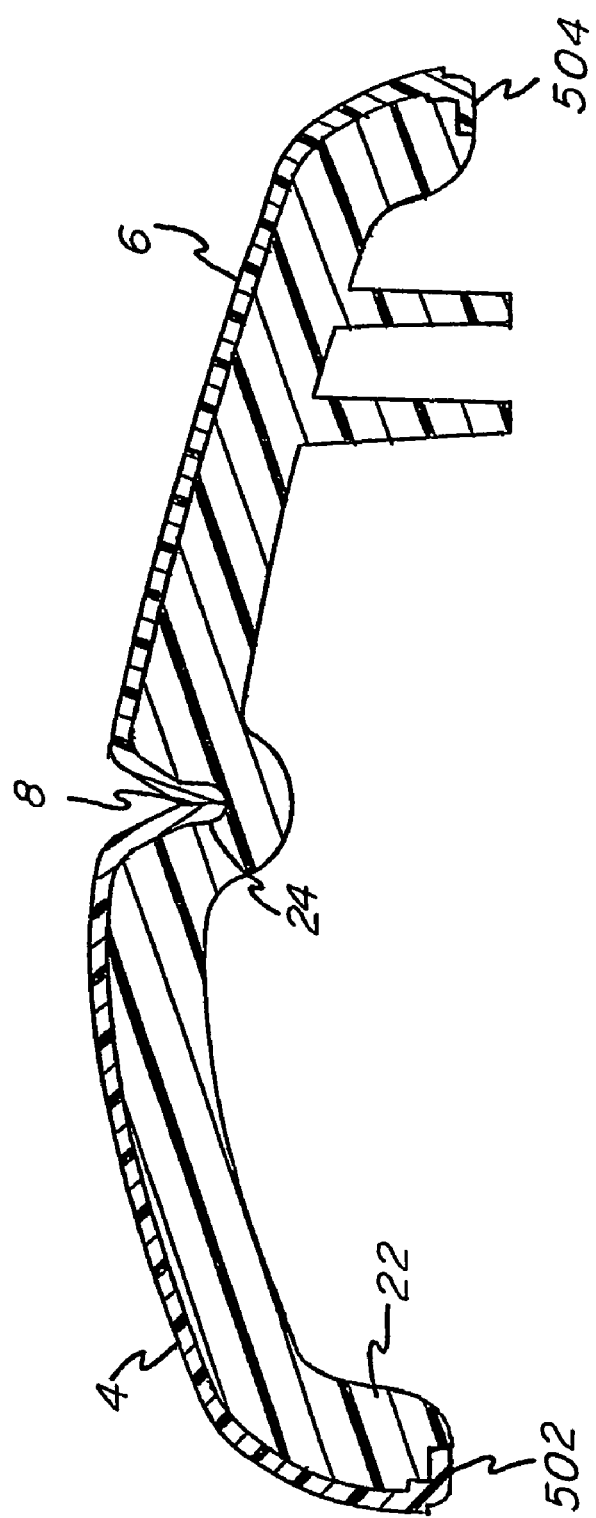
FIG. 4 is a sectional view of the part depicted in FIG. 3 taken along the plane indicated by the lines and arrows 4-4 in FIG. 3.

FIG. 4 shows more clearly the paint film laminate 2 fused over the underlying plastic substrate. As can be seen, transition line 8 is disposed in the center of the groove 24 which is provided in the underlying plastic substrate. Also re-entrant edge positions 502, 504 of the laminate cover or wrap around the contiguous longitudinally disposed edge portions of the part.

Figure 5:
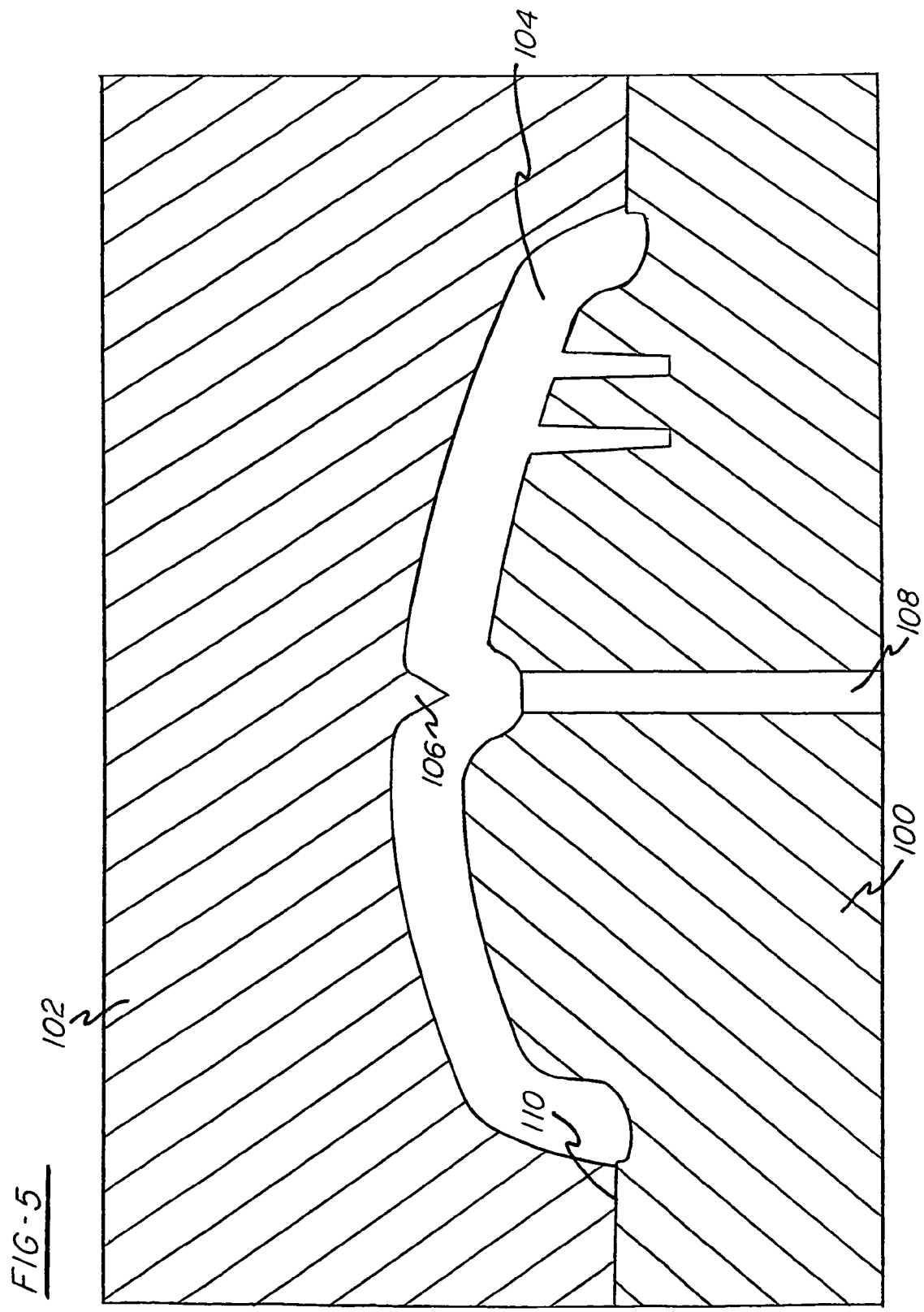
FIG. 5 is a cross-sectional view of a mold cavity that may be used to form the part shown in FIG. 3.

FIG. 5 depicts the mold cavity that is utilized in accordance with the instant invention to make the part shown in FIGS. 3 and 4. Here, the mold cavity comprises male mold member 100 and opposed female member 102 defining a mold cavity 104 therebetween. A ridge or partition 106, as shown, is provided in the female surface of the cavity and protrudes or extends toward the male member. This ridge member is utilized to form, upon insert molding, the groove 24 which is depicted in the part shown in FIGS. 3 and 4. With further respect to FIG. 5 of the drawings, as is conventional, a channel 108 is provided into which molten plastic material will be injected behind the paint film so as to form the part. A part line 110 is provided between the male and female mold members.

Figure 6:
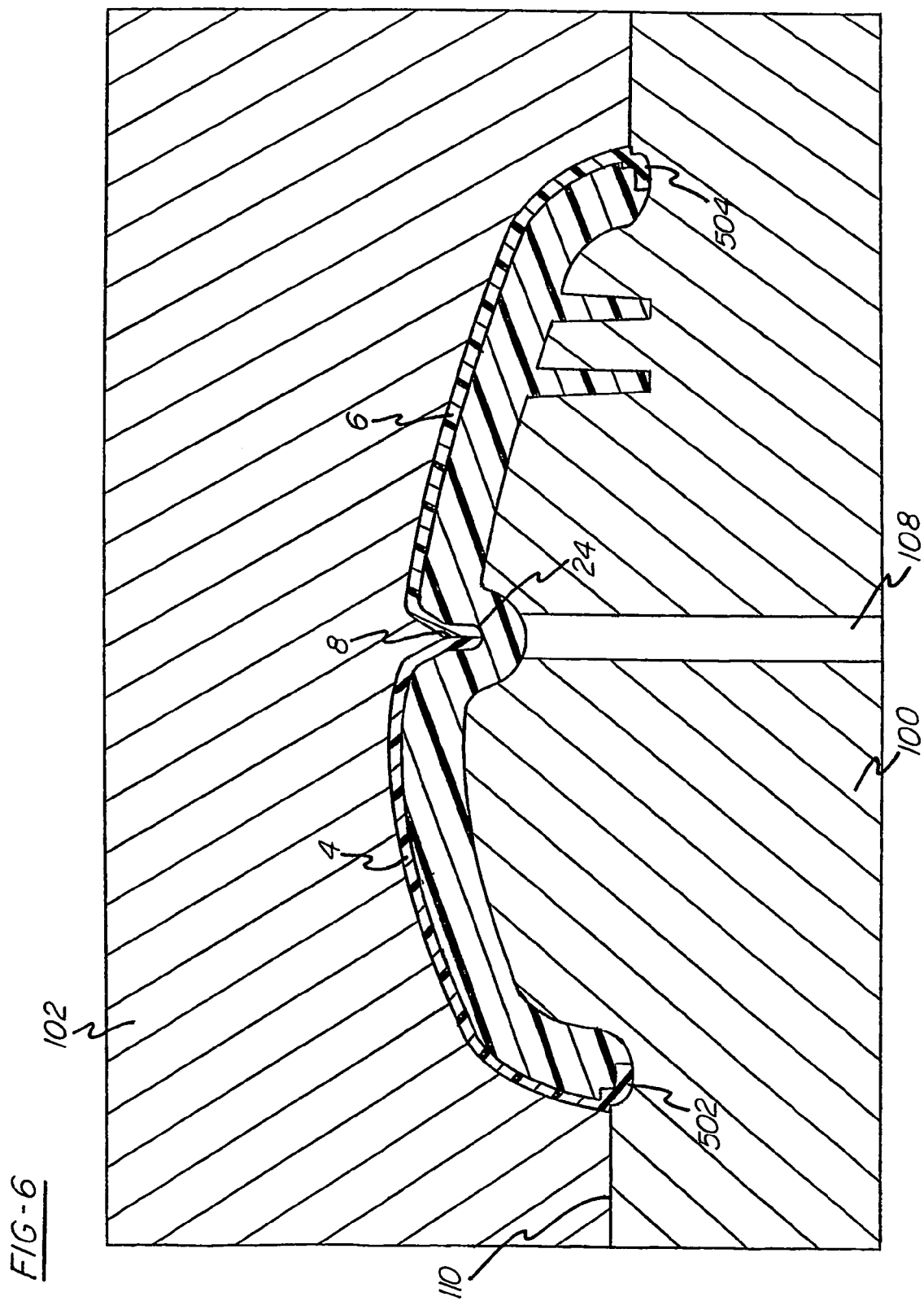
FIG. 6 is a cross-sectional view of the mold shown in FIG. 5 shown at the completion of the insert molding step.

FIG. 6 shows the mold cavity in time sequence in which the injected molten material has been placed in the mold so as to form, via insert molding, the requisite paint film laminate covered plastic part. Here, it can be seen that the paint film laminate comprises a first and second colored section numbered 4 and 6 respectively, with the transition line or border 8 between these colored sections centered within the groove 24 that is provided in the part.

It is also to be noted that re-entrant edges 502, 504 are provided on the paint film laminate, in accordance with prior art techniques so as to cover or wrap substantially around longitudinally disposed edges of the plastic substrate.

Figure 7:
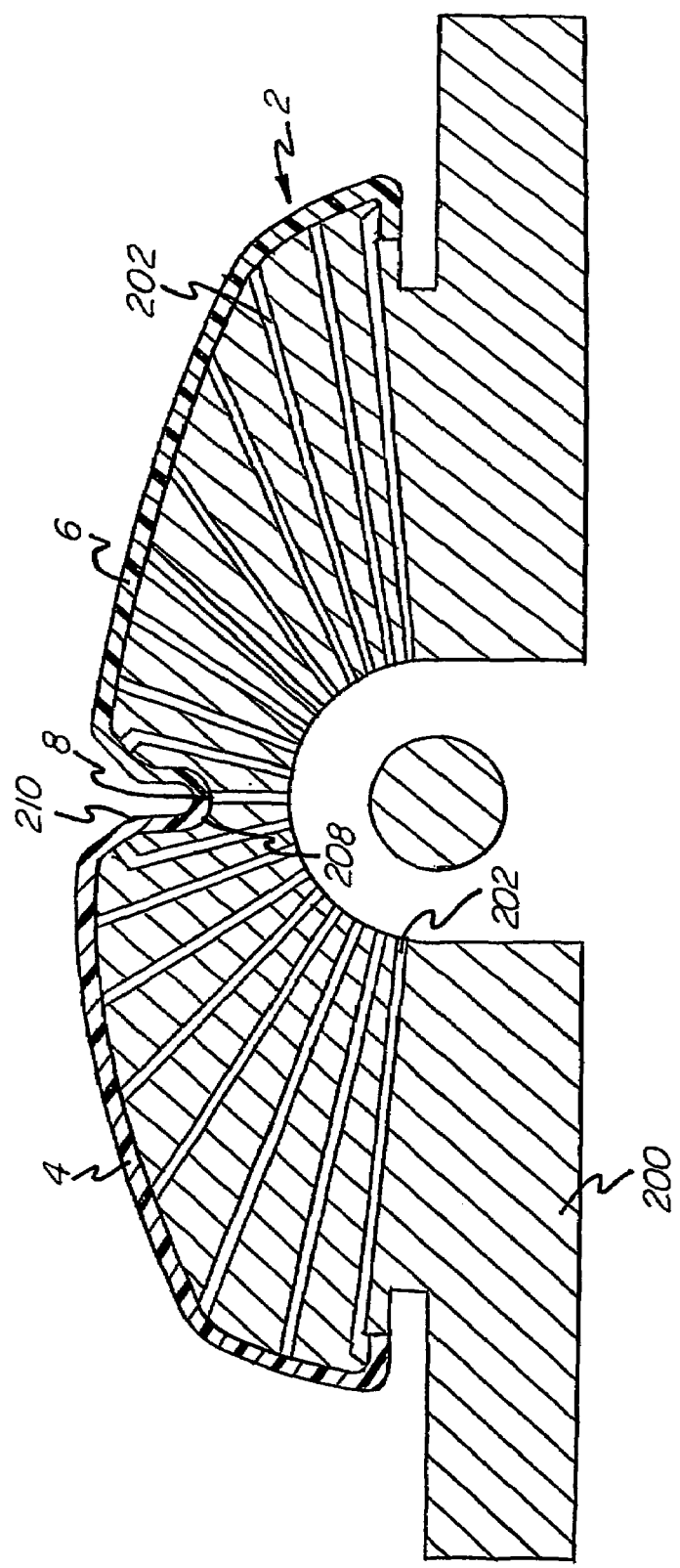
FIG. 7 is a cross-sectional view of a pattern block and associated paint film shown during the preferred step of pre-forming of the paint film laminate prior to the step of insert molding of the laminate over the desired plastic substrate.

FIG. 7 shows pattern block 200 which is used, in accordance with one aspect of the invention, to provide the paint film laminate precursor which, in turn, will be insert molded with the requisite molten plastic material. Here, it can be seen that the pattern block 200 is provided with a multiplicity of vacuum channels communicating with a vacuum source not shown. An elongated depression substantially in a U or V shape is formed along the pattern block and is numbered as 208 in FIG. 7. As the vacuum is drawn on the paint film laminate 2 as it is positioned on the pattern block 200, a groove 210 is formed along the transition line 8 that separates the first colored section from the second colored section of the laminate. This groove 210 is positioned in the mold, such as that shown in FIG. 5, so that it is wrapped snugly around the ridge 106 formed in the female mold member.

Although the instant invention has been primarily shown in conjunction with a two-tone film laminate, it is to be noted that additional colored sections may be provided on the laminate with each of the transition lines or areas separating each of the colored components of the laminate from a neighboring cross section and thereby fitting within a corresponding longitudinally extending groove formed in the plastic substrate. In such manner, a multiple colored part may be made wherein the border-areas separating each color component from its neighbor are embedded within a groove, so that the appearance of the film manifest to the viewer on the show side of the part is enhanced.

As is apparent from the above, when a plural colored component film laminate part is made by insert molding of the plural colored film laminate over the plastic substrate, a male mold member is provided that includes a core portion, and a female mold member is provided with a surface defining concavity therein. The male mold member and female mold member together define a mold cavity with the mold cavity including a corresponding ridge member which will, upon molding, form a desired groove in the plastic substrate.

The plural color film laminate is placed in the mold with the transition line or area thereof located proximate to this groove forming member. Upon insert molding, the transition line is fused into or molded into the grooved area of the substrate. As shown, the transition area of the paint film laminate may be preformed into the cross sectional substantially V or U shape. Preferably, and as depicted in FIG. 7, this performing step comprises vacuum formation of the transition area or line in the paint film laminate.

Although the instant invention emphasizes use of a single paint film laminate piece comprising plural color sections thereof, the skilled artisan will readily appreciate that a plurality of separately colored plastic strips or the like may also be employed with the border areas extending longitudinally along each said strip firmly anchored in the plastic substrate in a groove or channel member similar to the groove 24 shown in FIGS. 3 and 4. The phrase plural color laminate as used herein is intended to cover such plurality of strips or pieces.

Having described the invention in detail and by reference to preferred embodiments thereof, it will be apparent that modifications and variations are possible without departing from the scope of the appended claims. The invention is not limited to the fabrication of automotive parts and is applicable to the fabrication of insert molded parts for other end use applications. Furthermore, the invention is not limited to the insert molding of molten thermoplastic or thermosetting resins, and is applicable to other prepolymer materials such as solvent-based prepolymer materials that are compatible with the film laminate and the insert molding technique.

Having described the invention in detail and by reference to preferred embodiments thereof, it will be apparent that modifications and variations are possible without departing from the spirit of the invention as defined in the appended claims.

What is claimed is:

1. A plural color component film laminate part, comprising:
   a plastic substrate including first and second edges, said substrate having a groove with a bottom portion, said groove being positioned between said first and second edges;
   a plural color film laminate comprising a transition line between individual color portions of said laminate; and
   said film laminate being fused to said plastic substrate with said transition line being fused to said substrate proximate the bottom of said groove.

2. The plural color component film laminate part of claim 1, wherein:
   said plural color film laminate further comprises first and second re-entrant edge portions; and
   said first re-entrant edge portion of said film laminate covering said first edge of said plastic substrate, said second re-entrant edge portion of said film laminate covering said second edge of said plastic substrate.

3. The plural color component film laminate part of claim 1, wherein said plastic substrate comprises an injection molded thermoplastic or thermosetting resin.

4. The plural color component film laminate part of claim 1, wherein said film laminate comprises an extruded thermoplastic backing sheet and a cast dried continuous paint coating disposed over said backing sheet.

5. A plural color component film laminate part, comprising:
   a plastic substrate including first and second side portions defining first and second longitudinal edges, said substrate having a plurality of longitudinally extending grooves between said first and second longitudinal edges, each of said grooves having a bottom portion thereof;
   a plural color film laminate having a plurality of transition lines each said transition line separating individual color portions of said film laminate; and
   said film laminate being fused to said plastic substrate with each one of said transition lines fused to said substrate proximate one of said bottoms.

6. The plural color component film laminate part of claim 5, wherein:
   said plural color film laminate further comprises first and second re-entrant edge portions; and
   said first re-entrant edge portion of said film laminate covering said first longitudinal edge of said plastic substrate, said second re-entrant edge portion of said film laminate covering said second longitudinal edge of said plastic substrate.

7. The plural color component film laminate part of claim 5, wherein said plastic substrate comprises an injection molded thermoplastic or thermosetting resin.

8. The plural color component film laminate part of claim 5, wherein said film laminate comprises an extruded thermoplastic backing sheet and a cast dried continuous paint coating disposed over said backing sheet.

9. A plural color component film laminate part, comprising:
   a plastic substrate including first and second side portions defining first and second edges, said substrate having a groove with a bottom portion between said first and second edges;
   first and second color film laminates, each said film laminate including a border portion, said border portion of said first and second color laminates positioned adjacent each other in contiguous relation; and
   said first and second film laminates being fused to said plastic substrate such that said border portions of said first and second color film laminates are each fused to said substrate proximate said bottom portion.

10. The plural color component film laminate part of claim 9, wherein:
    said first and second film laminates further comprise a re-entrant edge portion; and
    said re-entrant edge portion of said first film laminate covering said first edge of said plastic substrate, said re-entrant edge portion of said second film laminate covering said second edge of said plastic substrate.

11. The plural color component film laminate part of claim 9, wherein said plastic substrate comprises an injection molded thermoplastic or thermosetting resin.

12. The plural color component film laminate part of claim 9, wherein said first and second film laminates comprise an extruded thermoplastic backing sheet and a cast dried continuous paint coating disposed over said backing sheet.

13. Method of making a plural color component film laminate part by insert molding of a plural color film laminate over a plastic substrate, to form a show side surface of said part, said method comprising:
    (a) providing a male mold member including a core portion and a female mold member having a surface defining a concavity therein, said male mold member and said female mold member together defining a mold cavity, said mold cavity including a ridge like forming member surface, said ridge forming an apex;

(b) providing a plural color film laminate, said laminate comprising a transition area located between individual colored portions of said paint film laminate;
(c) inserting said plural color film laminate into said mold cavity and positioning said transition area proximate to said ridge like forming member; and
(d) injecting molten plastic into said mold cavity and under said film whereby said film is superposed over said molten plastic and said transition area of said laminate is fixed to said plastic proximate to said apex of said ridge like forming member to form a groove.

14. Method as recited in claim 13 further comprising forming said transition area in said paint film laminate in the cross section of a V-shaped groove.

15. Method as recited in claim 13 further comprising vacuum forming said transition area in said paint film laminate, prior to said step (c) said transition area defining a grooved or channel like depression in said laminate.

16. Method of making a plural color component film laminate part by insert molding of a plural color film laminate over a plastic substrate, comprising:
    (a) providing a male mold member including a core portion and a female mold member having a surface defining a concavity therein, said male mold member and said female mold member mating along planar surfaces and defining together a mold cavity and a plane dividing said mold members into halves on either side of said plane, said mold cavity being defined in one of said halves between said surface in said female mold member and said core portion and being further defined by a plurality of longitudinally extending groove forming members extending from said female mold member toward said male mold member, each of said grooves having a bottom portion thereof;
    (b) inserting a plural color film laminate, with an individual transition line located between each of said colors in said laminate, into said mold cavity and positioning one of said transition lines in alignment with one of said longitudinally extending groove forming members; and
    (c) injecting molten plastic into said mold cavity and under said paint film laminate whereby said film is superposed over said molten plastic and substantially covers said molten plastic positioned along said groove forming members, thereby forming said plastic part with said transition lines being fused to said groove proximate said bottom in the show face side of the resulting part.

17. A plural color component film laminate part, comprising:
    a plastic substrate including first and second edges, said substrate having a groove positioned between said first and second edges;
    a plural color film laminate comprising a transition line between individual color portions of said laminate;
    said film laminate being fused to said plastic substrate with said transition line being disposed within said grove;
    said plural color film laminate further comprising first and second re-entrant edge portions; and
    said first re-entrant edge portion of said film laminate covering said first edge of said plastic substrate, said second re-entrant edge portion of said film laminate covering said second edge of said plastic substrate.

18. A plural color component film laminate part, comprising:
    a plastic substrate including first and second side portions defining first and second longitudinal edges, said substrate having a plurality of longitudinally extending grooves between said first and second longitudinal edges;
    a plural color film laminate having a plurality of transition lines each said transition line separating individual color portions of said film laminate;
    said film laminate being fused to said plastic substrate with each one of said transition lines disposed within one of said grooves;
    said plural color film laminate further comprising first and second re-entrant edge portions; and
    said first re-entrant edge portion of said film laminate covering said first longitudinal edge of said plastic substrate, said second re-entrant edge portion of said film laminate covering said second longitudinal edge of said plastic substrate.

19. A plural color component film laminate part, comprising:
    a plastic substrate including first and second side portions defining first and second edges, said substrate having a groove between said first and second edges;
    first and second color film laminates, each said film laminate including a border portion, said border portion of said first and second color laminates positioned adjacent each other in contiguous relation;
    said first and second film laminates being fused to said plastic substrate such that said border portions of said first and second color film laminates are each disposed within said groove;
    said first and second film laminates further comprising a re-entrant edge portion; and
    said re-entrant edge portion of said first film laminate covering said first edge of said plastic substrate, said re-entrant edge portion of said second film laminate covering said second edge of said plastic substrate.

* * * * *